US012163622B2

(12) United States Patent
Osborn

(10) Patent No.: US 12,163,622 B2
(45) Date of Patent: Dec. 10, 2024

(54) SUSPENDED HOLDER FOR TOOLS AND OTHER OBJECTS

(71) Applicant: Lane Osborn, Lee's Summit, MO (US)

(72) Inventor: Lane Osborn, Lee's Summit, MO (US)

(*) Notice: Subject to any disclaimer, the term of this patent is extended or adjusted under 35 U.S.C. 154(b) by 0 days.

(21) Appl. No.: 18/121,250

(22) Filed: Mar. 14, 2023

(65) Prior Publication Data
US 2023/0288019 A1 Sep. 14, 2023

Related U.S. Application Data

(60) Provisional application No. 63/319,664, filed on Mar. 14, 2022.

(51) Int. Cl.
F16M 13/02 (2006.01)

(52) U.S. Cl.
CPC .................. F16M 13/02 (2013.01)

(58) Field of Classification Search
CPC .................. F16M 13/02; B25H 3/04
USPC .................. 248/218.4; 211/68, 69, 70.6
See application file for complete search history.

(56) References Cited

U.S. PATENT DOCUMENTS

| | | | | |
|---|---|---|---|---|
| 2,815,863 A * | 12/1957 | Larson | ........... | A47B 81/007 248/300 |
| 3,603,551 A * | 9/1971 | Peterson | ........... | B25H 3/04 248/314 |
| D294,548 S * | 3/1988 | Wallace | ........... | D6/558 |
| 6,089,383 A * | 7/2000 | Heneveld | ........... | B25H 3/06 206/315.9 |
| 6,641,099 B1 * | 11/2003 | Lue | ........... | B25H 3/04 248/314 |
| 7,185,770 B1 * | 3/2007 | Roten | ........... | A47B 81/00 211/70.6 |
| 8,397,963 B2 * | 3/2013 | Singh | ........... | B60R 7/043 224/564 |
| 10,357,875 B2 * | 7/2019 | Mefferd | ........... | B25H 3/04 |
| 10,773,375 B2 * | 9/2020 | Mefferd | ........... | B25H 3/003 |
| 2005/0011841 A1 * | 1/2005 | Huish | ........... | B25H 3/04 211/70.6 |
| 2007/0210021 A1 * | 9/2007 | Whitehead | ........... | B25H 3/04 211/70.6 |
| 2013/0032555 A1 * | 2/2013 | Gaines, VII | ........... | B25H 3/04 211/70.6 |
| 2013/0220951 A1 * | 8/2013 | Dufour | ........... | E06C 7/14 211/13.1 |
| 2014/0197292 A1 * | 7/2014 | Figueroa | ........... | F16M 13/022 248/227.1 |
| 2015/0283695 A1 * | 10/2015 | Greenblatt | ........... | B25H 3/04 211/70.6 |
| 2023/0241760 A1 * | 8/2023 | Nair | ........... | B25H 3/04 248/220.1 |

* cited by examiner

Primary Examiner — Kimberly T Wood
(74) Attorney, Agent, or Firm — Law Office of Mark Brown, LLC; Christopher M DeBacker

(57) ABSTRACT

A holder is provided for suspension from a pole or other object. The holder includes a generally horizontal base unit with multiple receivers for receiving tools and various other objects. A generally vertical mounting unit extends from the base unit and is configured for placement on a utility pole or other object.

1 Claim, 5 Drawing Sheets

SUSPENDED HOLDER FOR TOOLS AND OTHER OBJECTS

CROSS-REFERENCE TO RELATED APPLICATION

This application claims priority in U.S. Provisional Patent Application No. 63/319,664, filed Mar. 14, 2022, which is incorporated herein by reference.

BACKGROUND OF THE INVENTION

1. Field of the Invention

The present invention relates generally to holders for tools and other objects, and particularly to a holder for attachment to utility poles and other vertical structures. Without limitation, an exemplary application of the present invention is use by workers constructing, repairing, inspecting and servicing elevated utility lines from utility poles. Other applications include installations mounted on walls, posts and columns.

2. Description of the Related Art

Utility workers commonly install and service elevated telecommunications and power utility lines. Bucket trucks and other aerial devices can be utilized for worker access. Workers' tools, hardware and other items can be carried in tool belts worn by the workers. Alternatively, tool holders and organizers are available for mounting in the buckets. For example, Bucket Knuckle™ organizing systems are available from Lineman Solutions Inc. of Orange, Calif. 92865.

Heretofore there has not been available a suspended holder for tools and other objects with the advantages and features of the present invention.

SUMMARY OF THE INVENTION

The present invention generally provides a suspended holder for tools and other objects. The holder generally comprises a base unit with receivers for tools and other objects, and a mounting unit configured for attachment to a utility pole or other object. The mounting unit can include extensions magnets for retaining ferromagnetic tools and hardware.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right, and left refer to the invention as orientated in the view being referred to. The words "inwardly" and "outwardly" refer to directions toward and away from, respectively, the geometric center of the aspect being described and designated parts thereof. Said terminology will include the words specifically mentioned, derivatives thereof and words of similar meaning.

Figure 1:
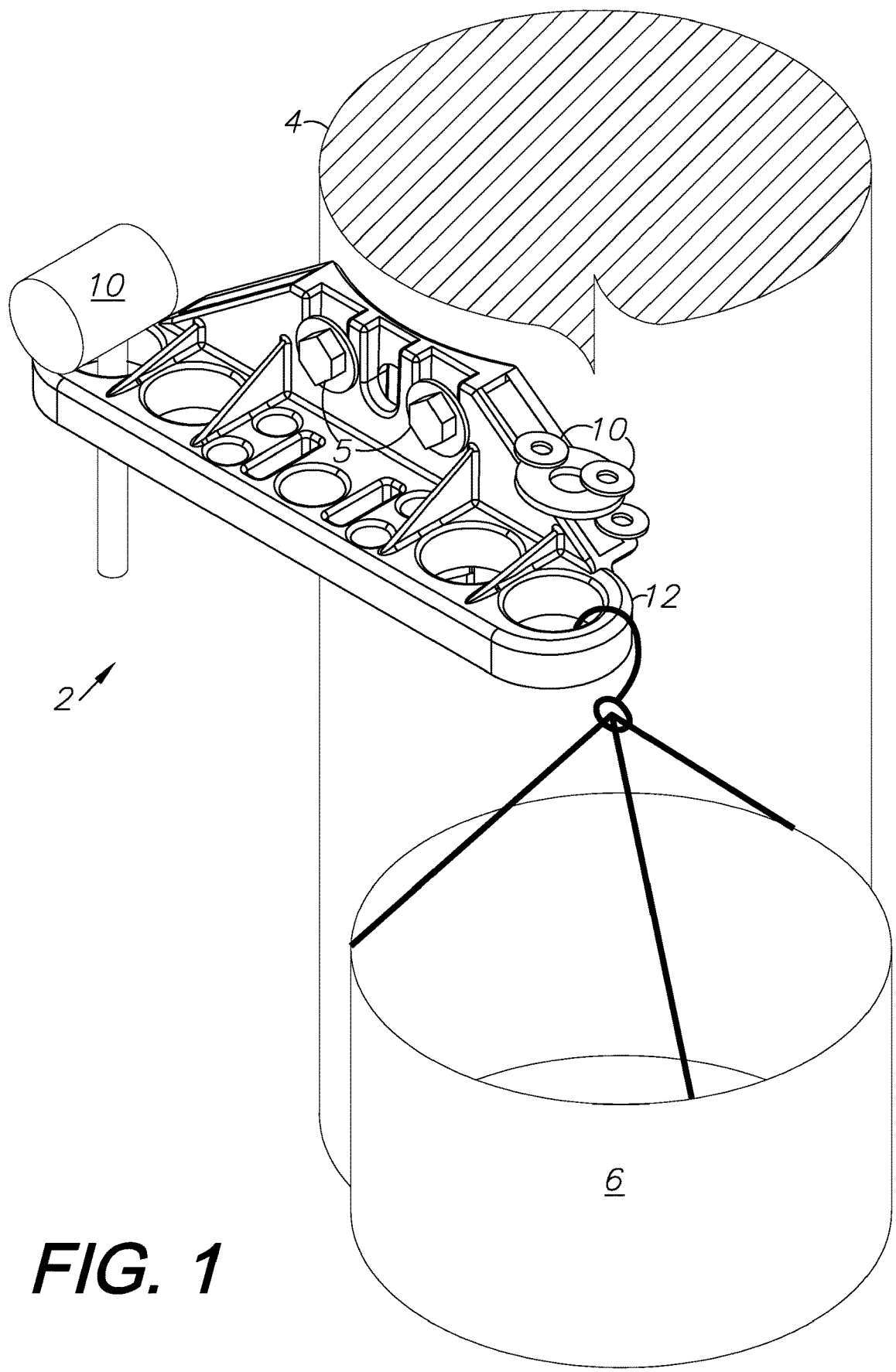
FIG. 1 is an upper, front, perspective view of a suspended holder embodying an aspect of the present invention, shown mounted on a utility pole.
Figure 2:
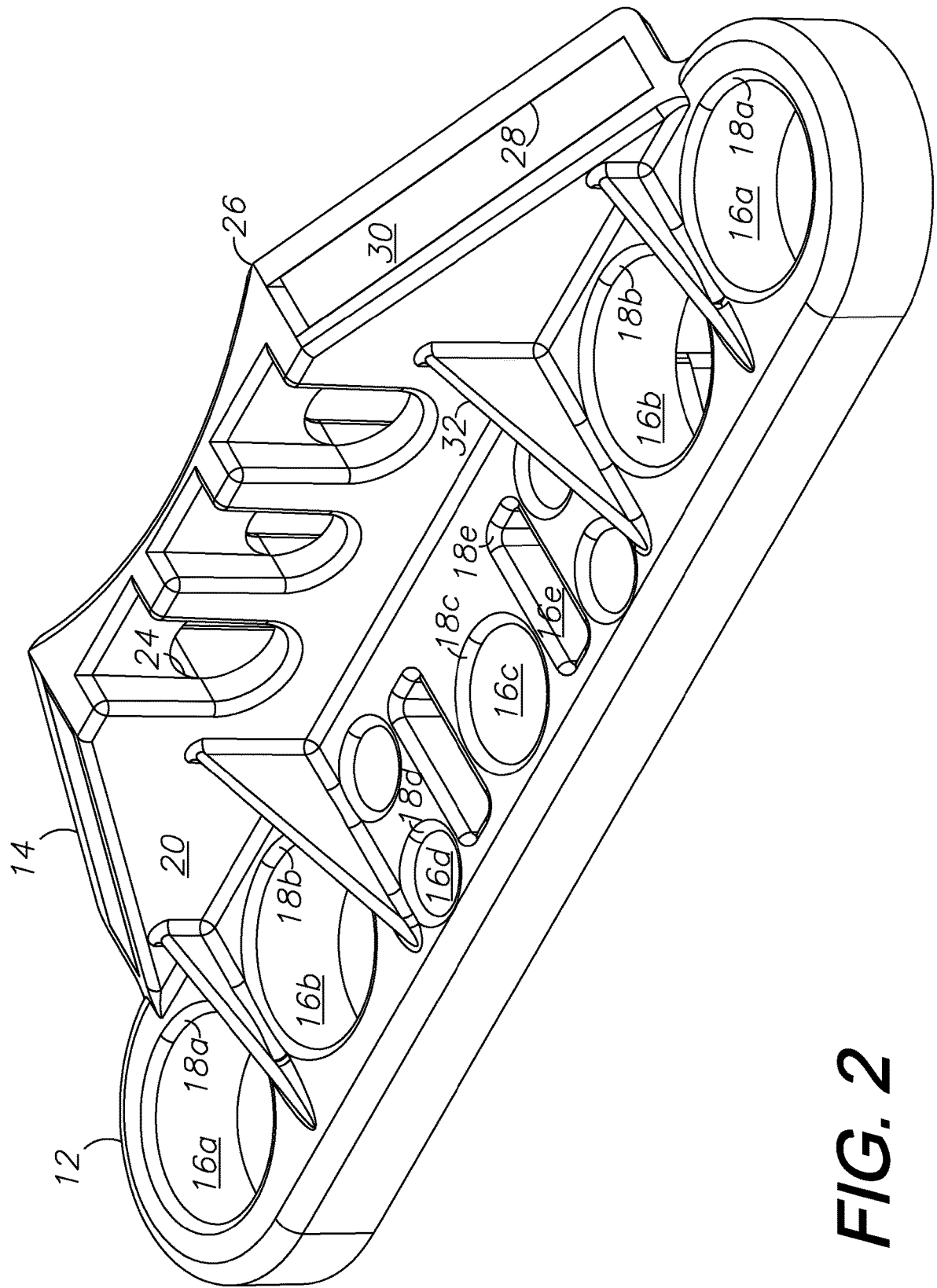
FIG. 2 is an upper, front, perspective view thereof.

Without limitation on the generality of useful embodiments and applications of the suspended holder of the present invention, an exemplary embodiment and application are shown in FIG. 1. The reference numeral 2 generally designates a suspended holder embodying an aspect of the present invention. The suspended holder 2 is shown mounted on a pole 4 by lag screws 5. The pole 4 can comprise a utility pole. Alternatively, the holder 2 can be mounted on a tree, a workbench, a vehicle or any other suitable structure.

A bucket 6 is shown suspended from the holder 2, which also receives a hammer 8. Various hardware parts 10 can be magnetically retained on top of the holder 2.

II. Preferred Embodiment Suspended Holder 2

The holder 2 generally comprises a horizontal base unit 12 and a vertical mounting unit 14. The base unit 12 includes multiple receivers 16 a, b, c, d, e with different sizes and configurations whereby a variety of tools and other objects can be accommodated. The receivers 16 a-e include respective chamfered, upper openings 18a-e, which facilitate guiding tool handles and other objects into their stored positions.

The vertical mounting unit 14 includes front and back faces 20, 22, with mounting bolt receivers 24 extending therebetween and configured for receiving the lag bolts 5. The vertical mounting unit back face 22 has a vertically-concave configuration to accommodate the curvature of a utility pole 4. The vertical mounting unit 14 also includes a pair of side panels 26 with generally triangular-shaped configurations. Upper edges of the side panels 26 include slots 28, which receive magnets 30 retaining ferromagnetic hardware parts 10.

III. Construction and Function

Without limitation on the generality of useful materials, the suspended holder 2 can be constructed of various plastics, such as polycarbonate, polyvinyl chloride (PVC), ultra-high molecular weight (UMHW) plastic, fiberglass and other suitable materials. The material is preferably chosen for characteristics including strength, durability, affordability and availability.

Figure 3:
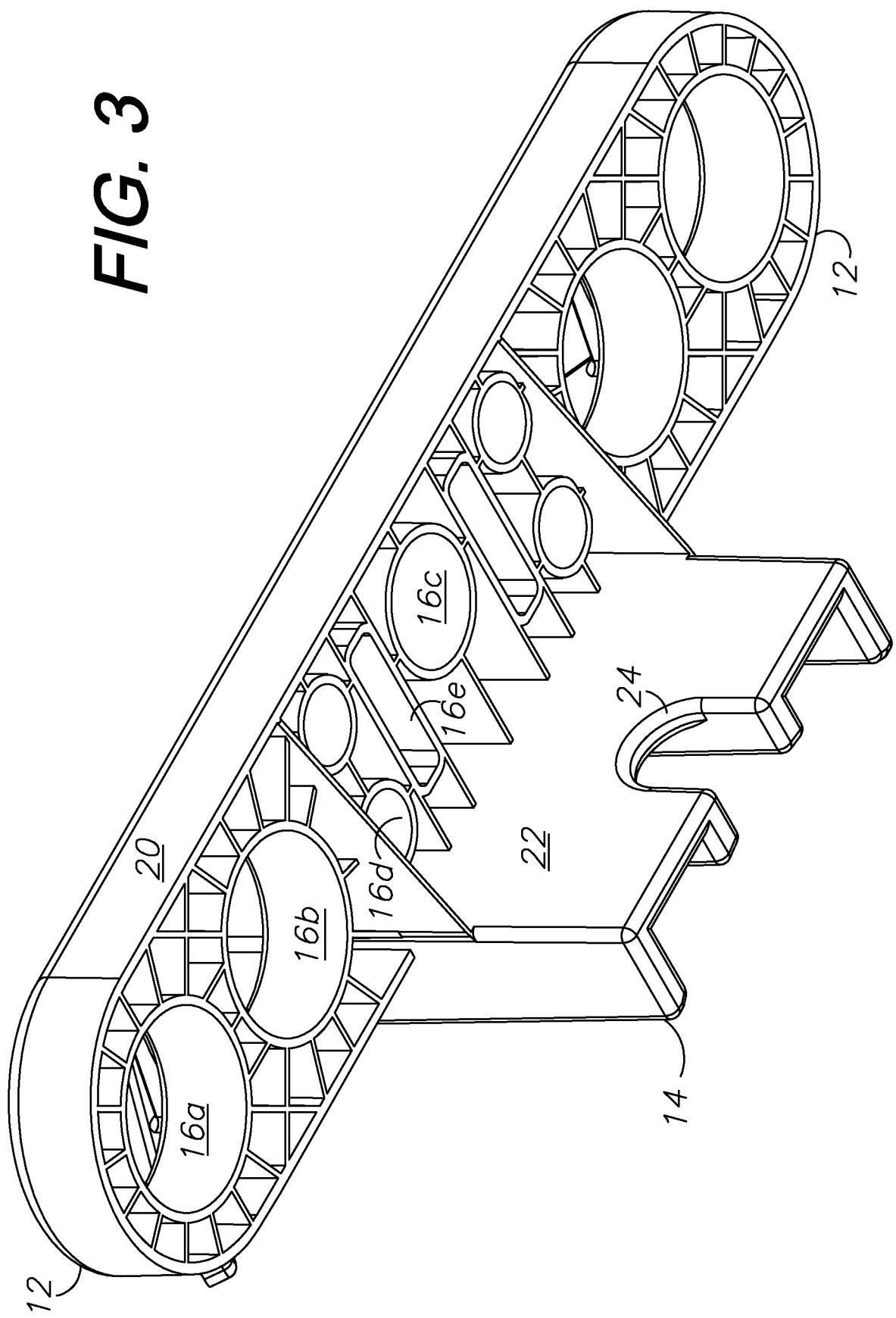
FIG. 3 is a bottom, front, perspective view thereof.
Figure 5:
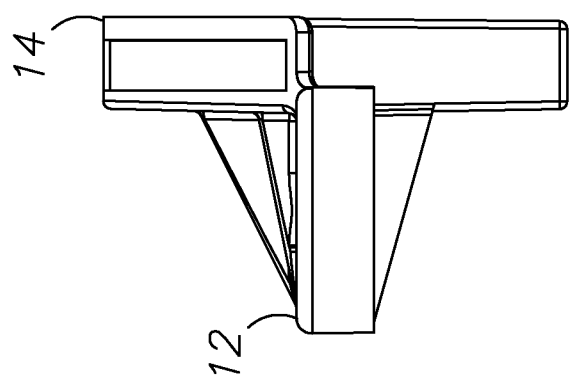
FIG. 5 is a side elevational view thereof.
Figure 4:
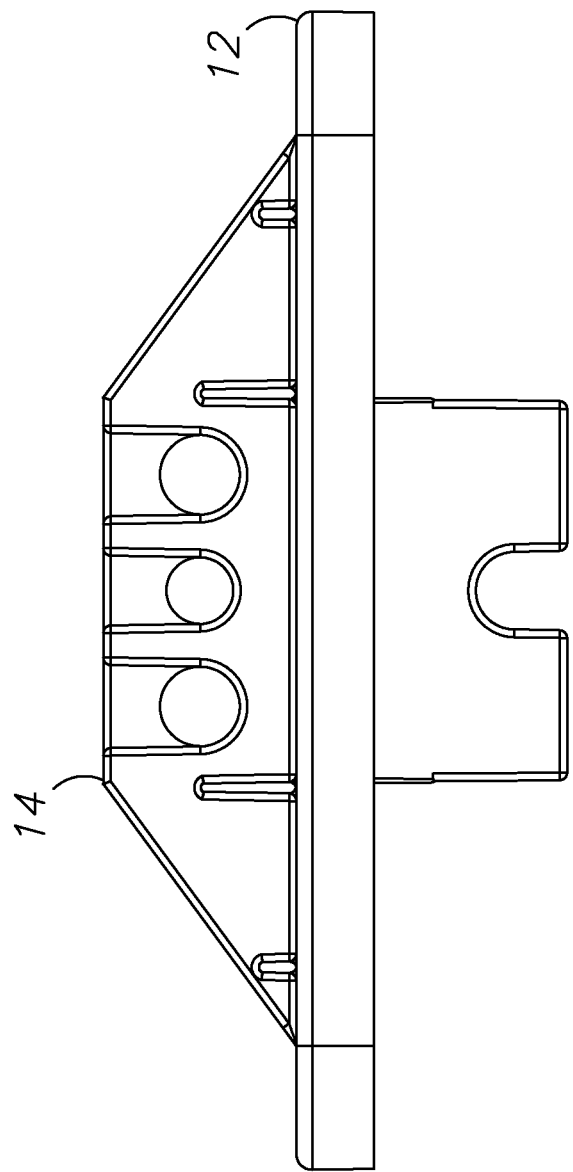
FIG. 4 is a front, elevational view thereof.
Figure 6:
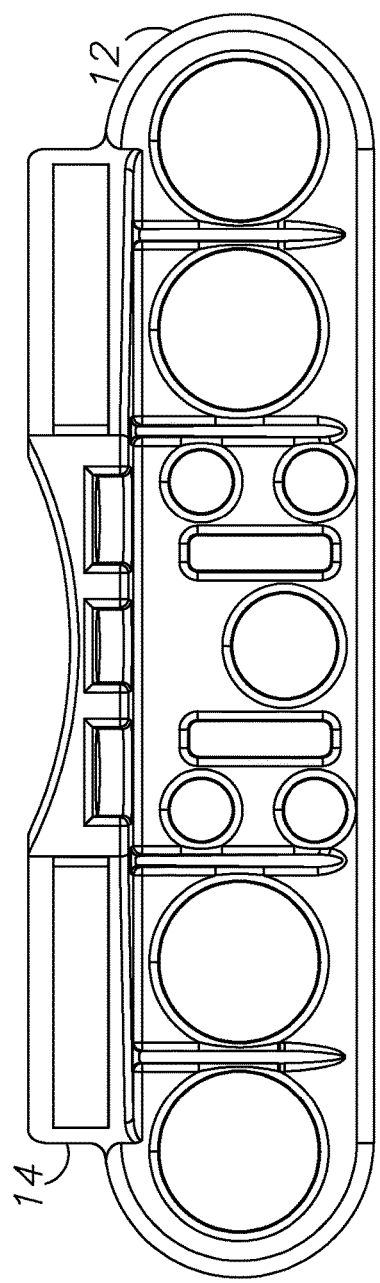
FIG. 6 is a top plan view thereof.
Figure 7:
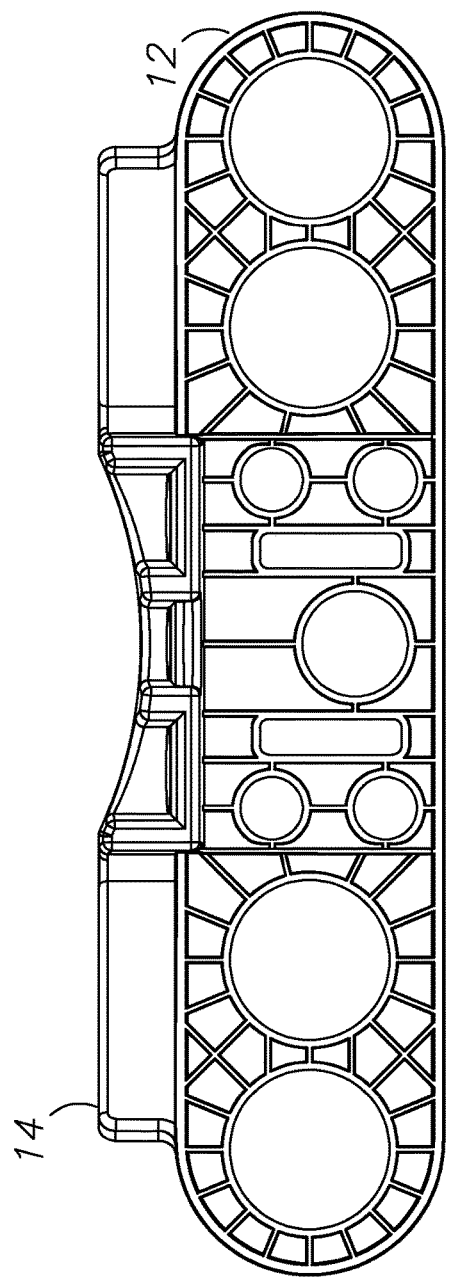
FIG. 7 is a bottom plan view thereof.

The suspended holder 2 can be formed by molding plastic in a desired configuration, or by any other suitable manufacturing method. For example, the base and mounting units 12, 14 can be formed separately and plastic welded together. Still further, the suspended holder can be cast of aluminum or any other suitable material. As shown in the drawings, generally-triangular gussets 32 can be located at strategic locations between the base and mounting units 12, 14 for providing strength and rigidity. As shown in FIG. 3, the base and mounting units 12, 14 can be molded with voids, whereby the material has a relatively uniform thickness throughout the holder. Material usage and overall holder weight can thus be minimized. Cost-effective production can thus be achieved. Moreover, a lighter holder is preferable for reducing the load carried by workers. In many usage applications, the holder and various other objects will be carried to elevated locations, utility poles. In such usage applications, minimizing weight loads is a priority.

Exemplary functional applications of the suspended holder 2 include aiding power linemen, telecommunication workers and electric utility personnel in wooden pole applications. For other, non-wooden mounting applications, straps, bands, adhesives, and other fasteners can be utilized. Also, without limitation, the suspended holder 2 is designed to hold tools and materials, such as ferromagnetic nuts and washers. Additional holding capacities include battery-powered tools, hand tools, relevant electrical/telecommunications material, and pole mounted hardware.

In operation, a worker can carry the holder 2 with him or her while climbing. After the holder is securely mounted in place, the worker can place tools, hardware, and other objects on it. Upon completion of a job, the holder is preferably emptied and dismounted from the supporting structure, such as a utility pole. Alternatively, the holders can be left in place for use in connection with additional procedures. The holder of the present invention can be restocked as needed by raising a container of parts and tools to the elevated position. Alternatively, the restocking tools, parts and other items can be carried up with workers.

In other applications, the holder of the present invention can be surface mounted on columns, posts, walls, and other structure. Still further, the holder can be mounted in and on vehicles and trailers for transporting among jobsites. For example, the tools, hardware, materials, and other objects can be specifically chosen based on the construction or service procedure to be performed. The holders can be pre-stocked to accommodate specific procedures, such as utility/telecommunications line construction and transformer replacement.

It is to be understood that the invention can be embodied in various forms and is not to be limited to the examples specifically discussed above. The range of components and configurations which can be utilized in the practice of the present invention is virtually unlimited.

Having thus described the invention, what is claimed as new and desired to be secured by Letters Patent is:

1. A holder configured for suspending objects on a vertically-oriented pole, which holder comprises:
    a generally horizontal base unit including multiple receivers each extending vertically through said base unit and configured for receiving an object in a suspended configuration;
    a generally vertical mounting unit including:
        a forwardly-concave surface configured for flush placement against the vertically-oriented pole;
        a fastener receiver configured for receiving a mechanical fastener for removably mounting said holder mounting unit on said vertically-oriented pole with said mounting unit, forwardly-concave surface against the vertically-oriented pole;
        an upper surface positioned in spaced relation above said base unit;
        a magnet mounted in said mounting unit and exposed at said upper surface thereof, said magnet configured for releasably retaining ferromagnetic objects on said holder;
    an integral, generally orthogonal connection between said mounting unit and said base unit; and
    multiple gussets each interconnecting said base unit and said mounting unit, each said gusset configured for stiffening said holder and reinforcing said integral connection between said mounting unit and said base unit.

* * * * *